US006276216B1

(12) United States Patent
Bittenbinder et al.

(10) Patent No.: US 6,276,216 B1
(45) Date of Patent: Aug. 21, 2001

(54) PNEUMATIC LIFTING DEVICE WITH INTEGRATED APPARATUS FOR MEASURING A TENSILE FORCE

(75) Inventors: Wolfgang Bittenbinder, Riesbürg-Utzmemmingen; Robert Kühn, Reimlingen, both of (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/451,035

(22) Filed: Nov. 29, 1999

(30) Foreign Application Priority Data

Dec. 16, 1998 (DE) .......................................... 298 22 269 U

(51) Int. Cl.[7] .................................. G01N 3/08; G01N 3/00
(52) U.S. Cl. .................................................. 73/837; 73/840
(58) Field of Search ............................... 73/816, 837, 840, 73/825, 857, 862.61, 862.621, 862.633, 862.634, 862.637

(56) References Cited

U.S. PATENT DOCUMENTS

| 4,240,289 | * | 12/1980 | Saner ................................ 73/862.59 |
| 4,270,384 | * | 6/1981 | Saner et al. ........................ 73/862.59 |
| 4,305,300 | * | 12/1981 | Petersen et al. ....................... 73/794 |
| 4,338,825 | * | 7/1982 | Amlani et al. .................... 73/862.633 |
| 5,340,951 | * | 12/1980 | Hungerbuhler et al. ......... 73/862.621 |

FOREIGN PATENT DOCUMENTS

| 87 11 385 U1 | 1/1989 | (DE) . |
| 41 32 108 A1 | 4/1993 | (DE) . |
| 43 05 914 C1 | 1/1995 | (DE) . |
| 44 15 518 A | 11/1995 | (DE) . |

* cited by examiner

Primary Examiner—Max Noori
(74) Attorney, Agent, or Firm—Henry M. Feiereisen

(57) ABSTRACT

A force gage for measuring a tensile force in a pneumatically-operated device, includes a parallelogram linkage having a pair of longitudinal arms in spaced-apart parallel disposition, and a pair of transverse arms in spaced-apart parallel disposition and hingedly interconnecting the longitudinal arms, with a first one of the longitudinal arms being acted upon by a tensile force and movable by the tensile force in the direction of the tensile force, whereby the pair of longitudinal arms is oriented in a direction parallel to the tensile force. A probe is positioned between the transverse arms and securely fixed to a second one of the longitudinal arms for generating a pneumatic pressure signal commensurate with the tensile force. The probe has a casing and a sensing element which projects out of the casing and is acted upon in dependence on the tensile force by a force-applying structure which may be either the first longitudinal arm or one of the transverse arms. In order to permit application of the force gage for hoists of varying load-carrying capability, a first elastic element is connected with at least two of the pair of longitudinal arms and the pair of transverse arms, such that the movement of the first longitudinal arm in response to the tensile force is opposed by an elastic force applied by the first elastic element, and a second elastic element, with the sensing element being connected in series with the second elastic element and supported by the force-applying structure.

20 Claims, 4 Drawing Sheets

PNEUMATIC LIFTING DEVICE WITH INTEGRATED APPARATUS FOR MEASURING A TENSILE FORCE

CROSS-REFERENCES TO RELATED APPLICATIONS

This application claims the priority of German Patent Application Serial No. 298 22 269.8, filed Dec. 16, 1998.

BACKGROUND OF THE INVENTION

The present invention relates, in general, to an apparatus for measuring a tensile force.

It is generally known to use such an apparatus, also called "force gage", to measure a tensile force for use in a pneumatic device. Conventional force gages typically include a pair of longitudinal arms in spaced-apart parallel disposition, and a pair of transverse arms in spaced-apart parallel disposition and hingedly interconnecting the longitudinal arms. One of the longitudinal arms is acted upon by a tensile force and moved thereby in the direction of the tensile force, whereby both longitudinal arms are oriented in a direction parallel to the tensile force. The other longitudinal arm is secured at its upper end, for example, to a traction means. A probe is positioned between the transverse arms and has a casing securely fixed to one of the longitudinal arms for generating a pneumatic pressure signal commensurate with the tensile force. Projecting out of the casing of the probe is a pressure bolt which is acted upon in dependence on the tensile force by a transverse arm which is securely fixed to the downwardly moving longitudinal arm.

The pneumatic lifting device may, for example, be a hoist or a control mechanism for tensile stress in a take-up reel. Examples of probes include a bulk modulus or a precision pressure controller.

As a consequence of their design, conventional force gages of this type can be loaded only to a certain limit value and thus yield a limit control pressure that is proportional to the limit value. For this reason, the practical use of conventional force gages is very narrow so that hoist manufacturers are forced to store an array of different force gages to satisfy varying load-carrying capabilities of hoists.

SUMMARY OF THE INVENTION

It is thus an object of the present invention to provide an improved apparatus for measuring a tensile force, obviating the afore-stated drawbacks.

In particular, it is an object of the present invention to provide an improved force gage which can be used for hoists with different load-carrying capabilities.

These objects, and others which will become apparent hereinafter, are attained in accordance with the present invention by providing a parallelogram linkage having a pair of longitudinal arms in spaced-apart parallel disposition, and a pair of transverse arms in spaced-apart parallel disposition and hingedly interconnecting the longitudinal arms, with a first one of the longitudinal arms being acted upon by a tensile force and movable by the tensile force in the direction of the tensile force, whereby the pair of longitudinal arms is oriented in a direction parallel to the tensile force; a probe, positioned between the transverse arms and securely fixed to a second one of the longitudinal arms, for generating a pneumatic pressure signal commensurate with the tensile force, with the probe having a casing and a sensing element which projects out of the casing and is acted upon in dependence on the tensile force by a force-applying structure which may be either the first longitudinal arm or one of the transverse arms; a first elastic element connected with at least two members selected from the group consisting of the pair of longitudinal arms and the pair of transverse arms, such that the movement of the first longitudinal arm in response to the tensile force is opposed by an elastic force applied by the first elastic element; and a second elastic element, with the sensing element connected in series with the second elastic element and supported by the force-applying structure.

Through the provision of two such elastic elements, the effective tensile force is split in two components, with a first component of the tensile force to be measured being supported by the probe, and with a second component being supported directly by the parallelogram linkage. The force gage can be so designed that only actions applied by the tensile force impact the probe, whereas potentially encountered side forces and/or tilting moments have no influence on the probe. Overall, the force gage operates free of reactive forces.

The tensile force may, for example, be split in such a manner that only half of the tensile force acts on the probe so that the maximum applicable load of the force gage can be doubled.

Suitably, each of the first elastic element and the second elastic element is a compression spring, e.g. a disk spring, thereby realizing a compact force gage.

According to another feature of the present invention, there is provided a longitudinal beam which extends transversely to and is securely fixed to one of the transverse arms in a zone within the parallelogram linkage in opposite disposition to the one longitudinal arm that is acted upon by the tensile force, with the first elastic element being supported between this longitudinal arm and the longitudinal beam. In order to best suit the force gage to different hoists, the effective component of the tensile force acting on the probe is controllable by providing an abutment for supporting the first elastic element, with the abutment being detachably securable to the longitudinal beam for displacement in a longitudinal direction.

According to still another feature of the present invention, there is provided a screw which attaches to the one longitudinal arm that is acted upon by the tensile force, with the screw having two stops for limiting a lateral or cross movement of the longitudinal beam with respect to the vertical center plane of the parallelogram, so as to protect the probe against overload. This simple feature prevents, on the one hand, a detachment of the springs when dynamic forces are encountered at the force gage, and, on the other hand, an overload of the probe when the probe is acted upon by excessive tensile forces.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
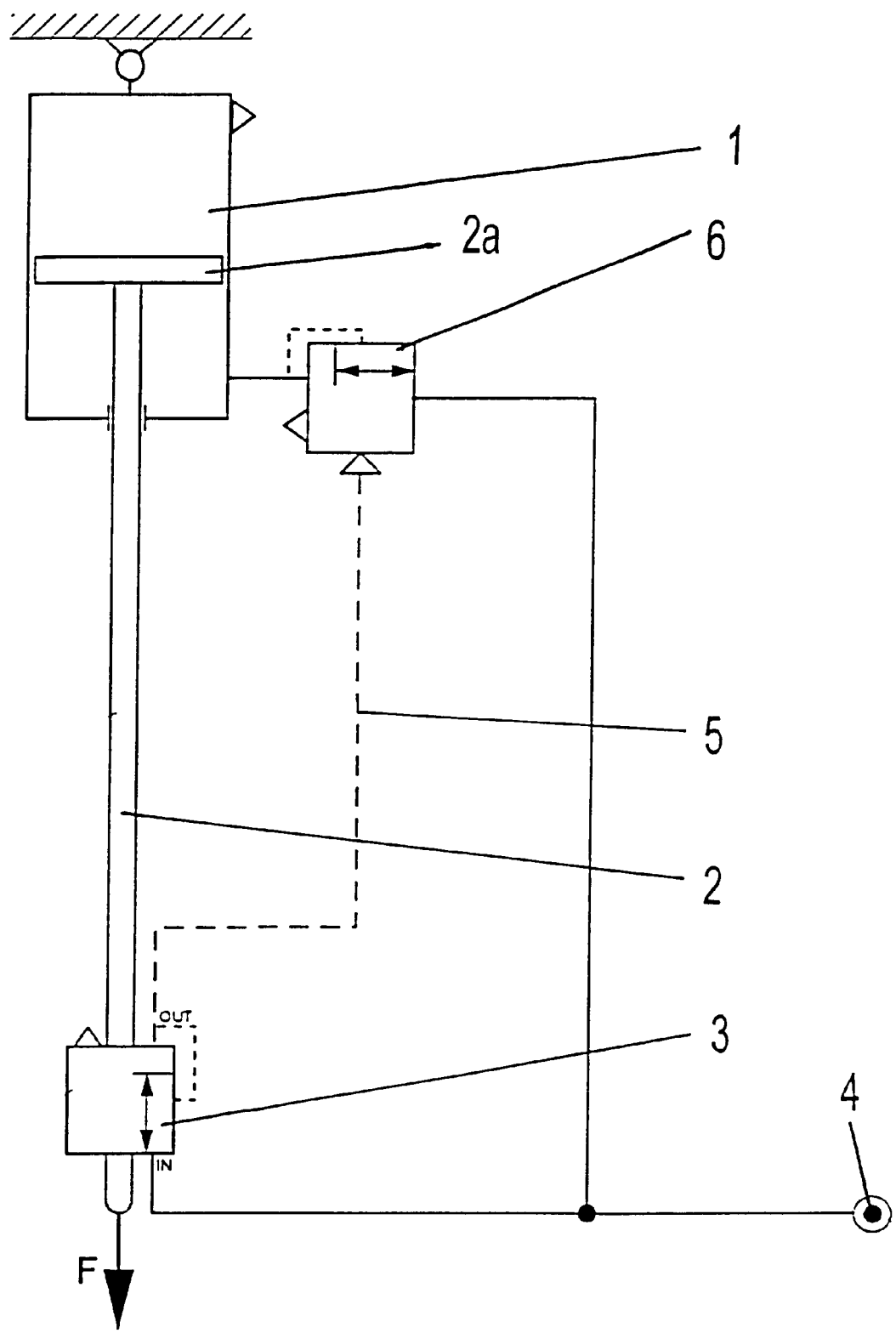
FIG. 1 is a schematic illustration of a pneumatic hoist having incorporated therein a force gage according to the present invention.

Throughout all the Figures, same or corresponding elements are generally indicated by same reference numerals.

Turning now to the drawing, and in particular to FIG. 1, there is shown a schematic illustration of a hoist including a pneumatic cylinder 1 which accommodates a piston 2a with its piston rod 2 extending out of the cylinder 1. The cylinder-distal end of the piston rod 2 carries a load (not shown) which applies a tensile force F. Integrated in the piston rod 2 is a pneumatic force gage 3 which is fed from a compressed air source 4 and sends an actuator signal (control pressure) to a pressure control valve 6 proportional to the actuator signal. The pressure control valve 6 is also fed from the compressed air source 4 and transmits to the cylinder 1 compressed air at a pressure commensurate with the actuator signal.

Figure 2:
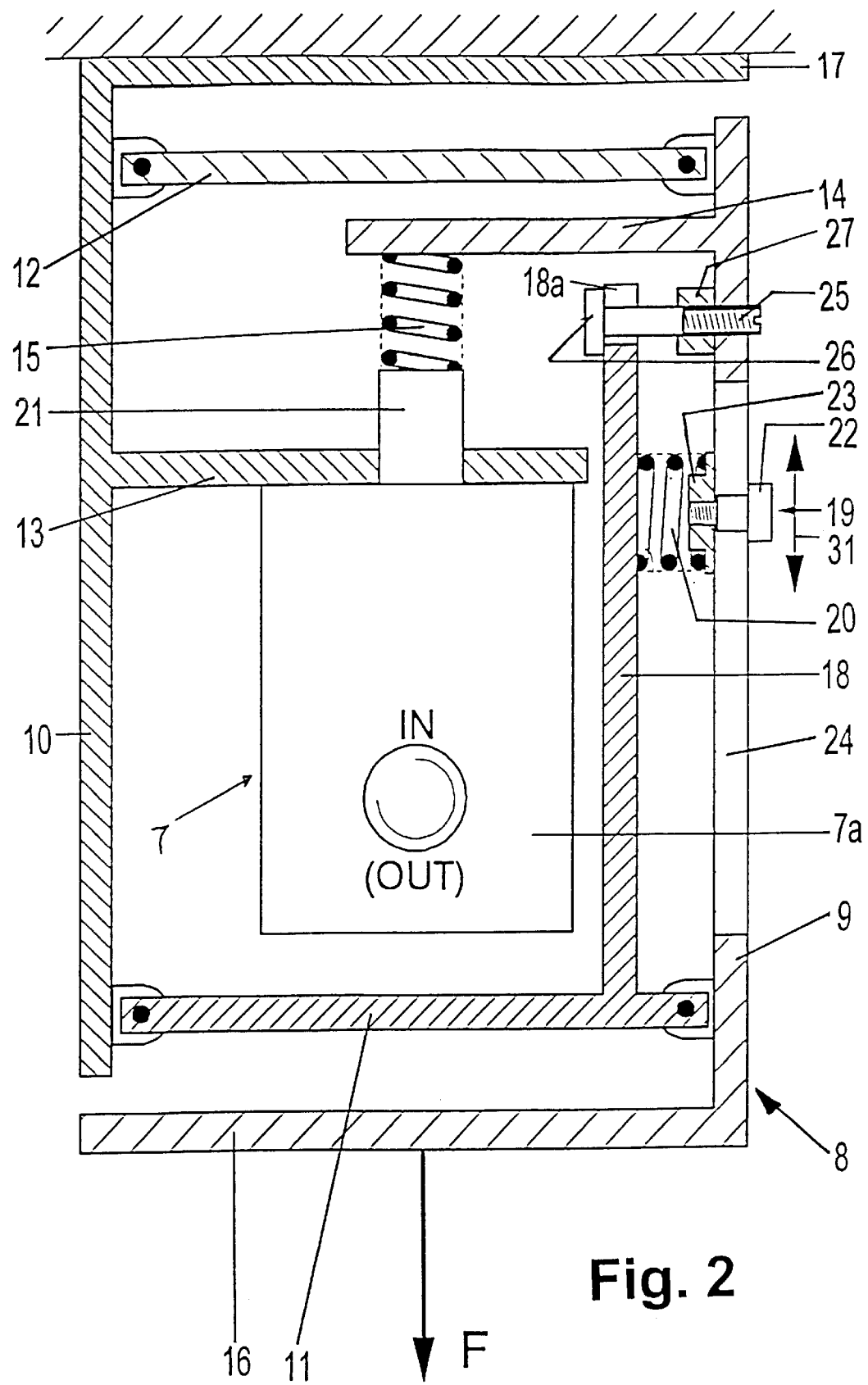
FIG. 2 is a longitudinal section of one embodiment of a pneumatic force gage according to the present invention.

Turning now to FIG. 2, there is shown a longitudinal section of one embodiment of the force gage 3 which includes a probe 7 and a frame structure, generally designated by reference numeral 8. The frame structure 8 includes two longitudinal arms 9, 10 arranged in spaced-apart parallel disposition and extending parallel to the direction of the applied tensile force F. At their ends, the longitudinal arms 9, 10 are interconnected together by two transverse arms 11, 12 which extend transversely to the direction of force F, thereby forming a parallelogram linkage. Fixedly secured to and extending inwardly from the longitudinal arm 9 within the parallelogram linkage in proximity to the transverse arm 12 is a cantilever beam 13, and fixedly secured to and extending inwardly from the longitudinal arm 10 within the parallelogram linkage is a cantilever beam 14. The cantilever beams 13, 14 are spaced from one another, with the probe 7 being mounted to the cantilever beam 13.

As further shown in FIG. 2, the longitudinal arm 9 is connected, outside the parallelogram linkage, with a lower supporting crossbar 16 whereas the longitudinal arm 10 is connected, outside the parallelogram linkage, with an upper supporting crossbar 17, whereby the tensile force F to be measured acts upon the lower crossbar 16 and an identical reactive force acts on the upper crossbar 17. As a consequence of this configuration of the frame structure 8, the probe 7 registers solely the tensile force F but not other moments.

Extending within the parallelogram linkage in parallel disposition to the longitudinal arm 9 is a further longitudinal beam 18 which has a lower end secured to the transverse arm 11. The longitudinal arm 9 has formed therein an elongate slot 24 for detachable securement of an abutment, generally designated by reference numeral 19. The abutment 19 is formed by a spring plate 23 which is positioned on the inside of the longitudinal arm 9 and secured in place by a screw 22 which is slideably guided in the slot 24 in a direction indicated by double arrow 31. The screw 22 can be rotated into an internal thread of the spring plate 23 so that the abutment 19 can be fixed in place at any desired position along the longitudinal arm 9 via the screw 22. Disposed between the longitudinal beam 18 and the spring plate 23 is a compression spring 20 which represents a first elastic element connected in series with the abutment 19.

The probe 7 includes a casing 7a and a sensing element 21 which projects out of the casing 21. A second elastic element in the form of a further compression spring 15 is arranged between the sensing element 21 and the cantilever beam 14. In the exemplified embodiment of FIG. 2, the sensing element 21 is disposed anteriorly of the compression spring 15. Persons skilled in the art will understand, however, that the sensing element 21 may certainly be disposed posteriorly of the compression spring 15, in which case the compression spring 15 is housed within the casing 7a of the probe 7. Thus, the particular relative arrangement of the compression spring 15 and the sensing element 21 is less crucial so long as the compression spring 15 and the sensing element 7a are disposed in series.

Through the provision of the first and second elastic elements (compression springs 15, 20), the tensile force F is split in first and second components, with the first component being supported via the compression spring 15 by the probe 7 and the second component being supported via the compression spring 20 by the longitudinal arm 9 of the frame structure 8. The ratio of both components can be adjusted to a wide degree through displacement of the abutment 19 along the longitudinal arm 9. Suitably, the compression springs 15, 20 are designed as disk springs to realize a compact configuration of the force gage.

A further screw 25 with a screw head 26 extends through a recess 18a of the longitudinal beam 18 and is secured to the longitudinal arm 9 near the cantilever beam 14. Mounted to the inside of the longitudinal arm 9 is a spacer disk 27 which is traversed by the screw 25 and forms one stop for the longitudinal beam 18, with the screw head 26 of the screw 25 forming another stop for the longitudinal beam 18. Through the provision of the spaced-apart stops (screw head 26 and spacer disk 27), the longitudinal beam 18 is received between the stops so that a deflection or laterally displacement thereof in transverse direction is restricted.

Figure 3:
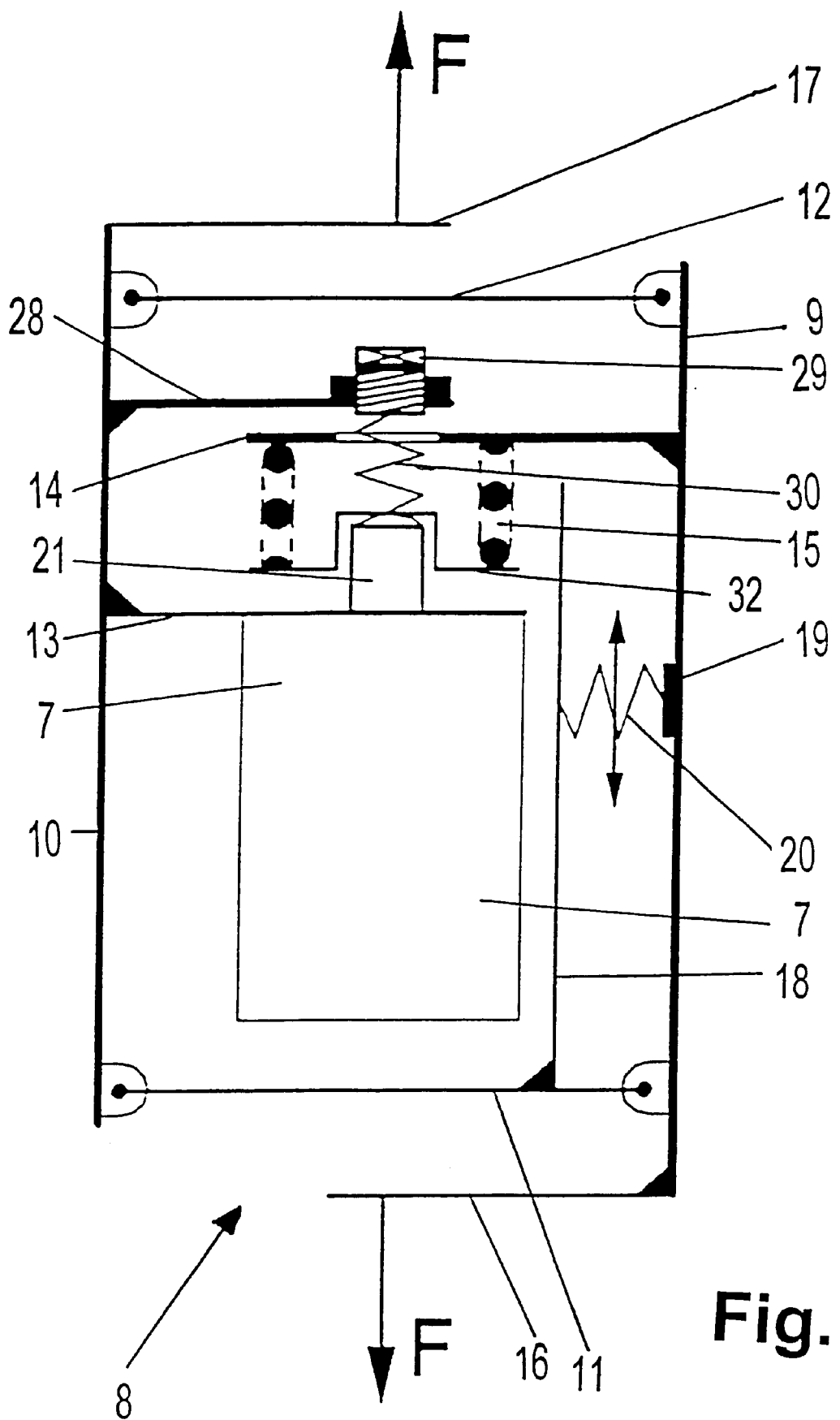
FIG. 3 is a schematic illustration of another embodiment of a force gage according to the present invention.

Referring now to FIG. 3, there is shown a schematic illustration of another embodiment of a force gage according to the present invention. Parts corresponding with those in FIG. 2 are denoted by identical reference numerals and not explained again. In this embodiment, provision is made for an additional cantilever beam 28 which extends transversely to the direction of tensile force F and is mounted to the longitudinal arm 10 which carries the cantilever beam 13. The cantilever beam 28 supports an adjusting screw 29 which acts upon a helical screw 30 to bias the sensing element 21 of the probe 7, whereby the compression spring 15 is disposed between a support 32, placed on the sensing element 21, and the cantilever beam 14.

Figure 4:
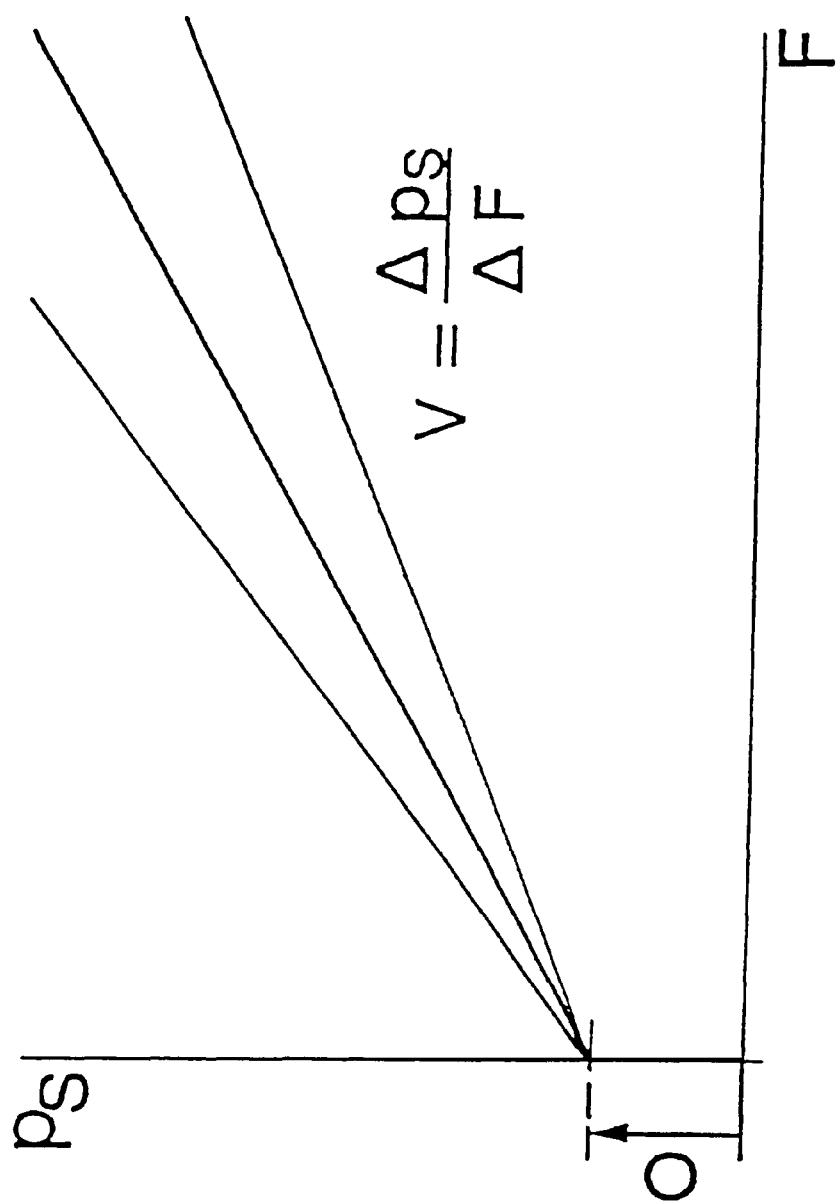
FIG. 4 is a graphical illustration showing the relation between force and control pressure with respect to the force gage of FIG. 3.

FIG. 4 shows a graphical illustration depicting the relation between force F and control pressure Ps with respect to the force gage of FIG. 3. A change of the bias of the compression spring 30, as applied by the adjusting screw 29, results in a parallel displacement (offset) of the control pressure gradient (control pressure $p_s$), and a displacement of the abutment 19 with the compression spring 20 along the longitudinal arm 9 permits a change of the ascent (reinforcement V) of the control pressure gradient, as shown by three graphs by way of example, whereby the following relation governs:

$$V = \Delta p_s / \Delta F$$

In this manner, the force gage can easily be suited to different applications.

While the invention has been illustrated and described as embodied in an apparatus for measuring a tensile force, it is not intended to be limited to the details shown since various modifications and structural changes may be made without departing in any way from the spirit of the present invention.

What is claimed as new and desired to be protected by letters patent is set forth in the appended claims:

What is claimed is:

1. Apparatus for measuring a tensile force in a pneumatically-operated device, comprising:
   a parallelogram linkage having a pair of longitudinal arms in spaced-apart parallel disposition, and a pair of transverse arms in spaced-apart parallel disposition and hingedly interconnecting the longitudinal arms, with a first one of the longitudinal arms being acted upon by a tensile force and movable by the tensile force in the direction of the tensile force, whereby the pair of longitudinal arms is oriented in a direction parallel to the tensile force;
   a probe, positioned between the transverse arms and securely fixed to a second one of the longitudinal arms, for generating a pneumatic pressure signal commensurate with the tensile force, said probe defined by a longitudinal axis and having a casing and a sensing element which projects out of the casing and is acted upon in dependence on the tensile force by a force-applying structure selected from the group consisting of the first longitudinal arm and one of the transverse arms;
   a first elastic element connected with at least two members selected from the group consisting of the pair of longitudinal arms and the pair of transverse arms, such that a movement of the first longitudinal arm in response to the tensile force is opposed by an elastic force applied by the first elastic element; and
   a second elastic element, said sensing element being connected in series with the second elastic element and supported by the force-applying structure.

2. The apparatus of claim 1 wherein each of the first elastic element and the second elastic element is a compression spring.

3. The apparatus of claim 2 wherein the compression spring is a disk spring.

4. The apparatus of claim 1 wherein each of the first and second longitudinal arms has opposite ends disposed outside the parallelogram linkage, and further comprising two supporting crossbars, one of the crossbars being securely fixed to one end of the first longitudinal arm and acted upon in a direction of the longitudinal axis of the probe by the tensile force being measured, and the other one of the crossbars being securely fixed to one end of the second longitudinal arm and acted upon by a reactive force commensurate with the tensile force.

5. The apparatus of claim 1, and further comprising a longitudinal beam extending transversely to and securely fixed to one of the transverse crossbars within the parallelogram linkage in immediate opposite disposition to the first longitudinal arm, said first elastic element being supported between the first longitudinal arm and the longitudinal beam.

6. The apparatus of claim 1, and further comprising an abutment for supporting the first elastic element, said abutment being detachably secured to the first longitudinal arm for displacement in a longitudinal direction.

7. The apparatus of claim 5, and further comprising a screw fastened into the longitudinal arm and having two stops for limiting a lateral movement of the first longitudinal beam.

8. Apparatus for measuring a tensile force, comprising:
   a frame structure having a parallelogram linkage defined by a pair of longitudinal arms, and a pair of transverse arms hingedly interconnecting the longitudinal arms, with a first one of the longitudinal arms being acted upon by a tensile force and movable by the tensile force in the direction of the tensile force;
   a probe, positioned between the transverse arms and securely fixed to a second one of the longitudinal arms, for generating a pneumatic pressure signal commensurate with the tensile force;
   elastic means integrated in the frame structure to divide the tensile force in two components, with one component being supported by the probe and the other component being supported by the parallelogram linkage.

9. The apparatus of claim 8 wherein the elastic means includes two compression springs, one of the compression springs being connected with at least two members selected from the group consisting of the pair of longitudinal arms and the pair of transverse arms, and the other one of the compression springs being connected in series with a sensing element of the probe.

10. The apparatus of claim 9 wherein each of the compression springs is a disk spring.

11. The apparatus of claim 8 wherein each of the first and second longitudinal arms has opposite ends disposed outside the parallelogram linkage, and further comprising two supporting crossbars, one of the crossbars being securely fixed to one end of the first longitudinal arm and acted upon in a direction of the longitudinal axis of the probe by the tensile force being measured, and the other one of the crossbars being securely fixed to one end of the second longitudinal arm and acted upon by a reactive force commensurate with the tensile force.

12. The apparatus of claim 9, and further comprising a longitudinal beam extending transversely to and securely fixed to one of the transverse crossbars within the parallelogram linkage in immediate opposite disposition to the first longitudinal arm, said one compression spring being supported between the first longitudinal arm and the longitudinal beam.

13. The apparatus of claim 8, and further comprising an abutment for supporting the one compression spring, said abutment being detachably secured to the first longitudinal arm for displacement in a longitudinal direction.

14. The apparatus of claim 12, and further comprising a screw fastened into the longitudinal arm and having two stops for limiting a lateral movement of the first longitudinal beam.

15. Apparatus for measuring a tensile force in a pneumatically-operated device, comprising:
   a parallelogram linkage having a pair of longitudinal arms in spaced-apart parallel disposition, and a pair of transverse arms in spaced-apart parallel disposition and hingedly interconnecting the longitudinal arms, with a first one of the longitudinal arms being acted upon by a tensile force and movable by the tensile force in the direction of the tensile force, whereby the pair of longitudinal arms is oriented in a direction parallel to the tensile force;
   a probe, positioned between the transverse arms and securely fixed to a second one of the longitudinal arms, for generating a pneumatic pressure signal commensurate with the tensile force, said probe defined by a longitudinal axis and having a casing and a sensing element which projects out of the casing and is acted upon in dependence on the tensile force by a force-applying structure selected from the group consisting of the first longitudinal arm and one of the transverse arms;

a first elastic element connected with at least two members selected from the group consisting of the pair of longitudinal arms and the pair of transverse arms, such that a movement of the first longitudinal arm in response to the tensile force is opposed by an elastic force applied by the first elastic element;

a second elastic element, said sensing element being connected in series with the second elastic element and supported by the force-applying structure; and an abutment for supporting the first elastic element, said abutment being detachably secured to the first longitudinal arm for displacement in a longitudinal direction.

16. The apparatus of claim 15 wherein each of the first elastic element and the second elastic element is a compression spring.

17. The apparatus of claim 16 wherein the compression spring is a disk spring.

18. The apparatus of claim 15 wherein each of the first and second longitudinal arms has opposite ends disposed outside the parallelogram linkage, and further comprising two supporting crossbars, one of the crossbars being securely fixed to one end of the first longitudinal arm and acted upon in a direction of the longitudinal axis of the probe by the tensile force being measured, and the other one of the crossbars being securely fixed to one end of the second longitudinal arm and acted upon by a reactive force commensurate with the tensile force.

19. The apparatus of claim 15, and further comprising a longitudinal beam extending transversely to and securely fixed to one of the transverse crossbars within the parallelogram linkage in immediate opposite disposition to the first longitudinal arm, said first elastic element being supported between the first longitudinal arm and the longitudinal beam.

20. The apparatus of claim 19, and further comprising a screw fastened into the first longitudinal arm and having two stops for limiting a lateral movement of the first longitudinal beam.

* * * * *